(12) United States Patent
Sandambata

(10) Patent No.: US 11,825,230 B2
(45) Date of Patent: Nov. 21, 2023

(54) IMAGING APPARATUS AND STORAGE MEDIUM

(71) Applicant: CANON KABUSHIKI KAISHA, Tokyo (JP)

(72) Inventor: Akira Sandambata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/168,736

(22) Filed: Feb. 5, 2021

(65) Prior Publication Data
US 2021/0258512 A1 Aug. 19, 2021

(30) Foreign Application Priority Data
Feb. 14, 2020 (JP) .................................. 2020-023732

(51) Int. Cl.
| | |
|---|---|
| H04N 5/262 | (2006.01) |
| H04N 5/232 | (2006.01) |
| H04N 5/268 | (2006.01) |
| H04N 5/247 | (2006.01) |
| H04N 23/61 | (2023.01) |
| H04N 23/80 | (2023.01) |
| H04N 23/90 | (2023.01) |
| H04N 23/695 | (2023.01) |

(52) U.S. Cl.
CPC ........... *H04N 5/2628* (2013.01); *H04N 5/268* (2013.01); *H04N 23/61* (2023.01); *H04N 23/695* (2023.01); *H04N 23/80* (2023.01); *H04N 23/90* (2023.01)

(58) Field of Classification Search
CPC ............. H04N 5/23299; H04N 5/2628; H04N 5/2258; H04N 5/2259; H04N 5/23296; H04N 5/23218; H04N 5/247; H04N 5/268; G08B 13/1963; G08B 13/19689; G08B 13/19641
See application file for complete search history.

(56) References Cited

U.S. PATENT DOCUMENTS

| | | | |
|---|---|---|---|
| 6,927,905 B1 * | 8/2005 | Kashitani | H04N 23/66 359/402 |
| 11,049,215 B2 * | 6/2021 | Takenaka | H04N 5/23238 |

(Continued)

FOREIGN PATENT DOCUMENTS

JP 2008204384 A 9/2008

*Primary Examiner* — Chiawei Chen
(74) *Attorney, Agent, or Firm* — ROSSI, KIMMS & McDOWELL LLP

(57) ABSTRACT

In order to provide an imaging apparatus in which unnecessary rotation of an image caused by rotation of a movable unit is able to simply be corrected, the imaging apparatus has the following configuration: an imaging unit configured to acquire an image; a movable unit configured to change a direction of the imaging unit through rotation thereof around a predetermined axis; and at least one processor or circuit configured to function as a correction processing unit at least one processor or circuit configured to function as a correction processing unit configured to perform correction processing of correcting rotation of the image caused by rotation of the movable unit on the basis on the information on a relationship between a rotation angle around the axis and a rotation angle of an image acquired by the imaging unit.

23 Claims, 10 Drawing Sheets

(56) References Cited

U.S. PATENT DOCUMENTS

| | | | |
|---|---|---|---|
| 2003/0227555 A1* | 12/2003 | Kobayashi | G08B 13/19686 348/231.6 |
| 2004/0141089 A1* | 7/2004 | Wada | F16M 11/245 348/E13.008 |
| 2005/0168583 A1* | 8/2005 | Thomason | G06T 3/608 348/208.4 |
| 2006/0203090 A1* | 9/2006 | Wang | G08B 13/19608 348/143 |
| 2006/0221098 A1* | 10/2006 | Matsui | G06T 7/74 345/633 |
| 2007/0115365 A1* | 5/2007 | Sato | G08B 13/19676 348/E5.042 |
| 2009/0128647 A1* | 5/2009 | Fahn | H04N 5/23219 348/E5.037 |
| 2011/0175991 A1* | 7/2011 | Hoeg | G02B 27/642 348/E9.033 |
| 2013/0162760 A1* | 6/2013 | Olavi | G03B 17/12 348/36 |
| 2015/0077614 A1* | 3/2015 | King | G03B 17/561 348/311 |
| 2015/0085149 A1* | 3/2015 | Tsubaki | H04N 5/23287 348/208.4 |
| 2016/0134801 A1* | 5/2016 | Ashitani | H04N 23/58 348/211.3 |
| 2016/0255273 A1* | 9/2016 | Wakamatsu | H04N 5/23258 348/208.99 |
| 2017/0023492 A1* | 1/2017 | Olsson | H04N 5/345 |
| 2017/0085776 A1* | 3/2017 | Iwasaki | H04N 7/183 |
| 2017/0116704 A1* | 4/2017 | Takenaka | G06T 3/0062 |
| 2017/0230580 A1* | 8/2017 | Ohara | H04N 23/69 |
| 2018/0316865 A1* | 11/2018 | Wakamatsu | H04N 23/6812 |
| 2019/0132576 A1* | 5/2019 | Zhang | H04N 5/247 |
| 2019/0182426 A1* | 6/2019 | Higashi | H04N 5/23264 |
| 2019/0266863 A1* | 8/2019 | Kondou | G08B 13/19632 |
| 2019/0327420 A1* | 10/2019 | Schieltz | G08B 13/19632 |
| 2020/0128179 A1* | 4/2020 | Kawasaki | H04N 5/2628 |
| 2020/0236289 A1* | 7/2020 | Sacco | H04N 5/232125 |

* cited by examiner

| TILT ANGLE | ANGLE CORRECTION TABLE 504 ||||
| | CORRECTION ANGLE ||||
| | IMAGING UNIT A | IMAGING UNIT B | IMAGING UNIT C | IMAGING UNIT D |
|---|---|---|---|---|
| 0 | 0 | 0 | 0 | 0 |
| 1 | 0.6 | 0.3 | 0.3 | 0.6 |
| ... | ... | ... | ... | ... |
| 89 | 79.4 | 29.7 | 29.7 | 79.4 |
| 90 | 80 | 30 | 30 | 80 |

TILT OF SENSOR = $\sin\theta \sin^{-1}\left(\frac{r}{a}\right)$

θ ROTATION

IMAGING APPARATUS AND STORAGE MEDIUM

BACKGROUND OF THE INVENTION

Field of the Invention

The present invention relates to an imaging apparatus and the like, and more particularly to an imaging apparatus in which a direction of an imaging unit can be changed.

Description of the Related Art

In an imaging apparatus including a plurality of imaging units, a multi-lens machine in which the plurality of imaging units move or rotate in a group at the same time if one axis of rotation is rotated is known. In this multi-lens machine, each imaging unit is disposed, for example, on a spherical surface and has a twisted positional relationship from the axis of rotation. Thus, an image has rotation components around an optical axis when the axis of rotation rotates.

The twisted positional relationship mentioned herein means that a direction of a perpendicular line passing through a center point of a rotating sphere above the axis of rotation is not parallel but inclined with respect to a direction of the optical axis of the imaging unit at a point above the spherical surface.

The rotation components of the image of the imaging unit rotating around the optical axis differ in accordance with a relative positional relationship between a position at which the imaging unit is attached and the optical axis, and the axis of rotation of the imaging unit, and decreases as the position becomes farther from an end of the axis of rotation, and increases as the position becomes closer to the end of the axis of rotation, in view of a structure of a rotation mechanism. For this reason, images acquired from each of imaging units have rotations of different rotation angles.

Japanese Patent Laid-Open No. 2008-204384 discloses a method for solving a problem in which a tilted pan/tilt axis is provided when an imaging apparatus has a tilted installation location.

However, the related art described in Japanese Patent Laid-Open No. 2008-204384 described above is for the purpose of correcting the tilt in an image caused by tilting of an installation position and is not for the purpose of correcting an image acquired by an imaging unit disposed in a twisted positional relationship with respect to an axis of rotation.

Also, when a tilt of a pan/tilt axis is corrected using the technique described in Japanese Patent Laid-Open No. 2008-204384, it is necessary to calculate parameters due to the installation environment and parameters based on a pan/tilt angle. Thus, processing becomes complicated.

Therefore, an object of the present invention is to provide an imaging apparatus in which unnecessary rotation of an image caused by the rotation of a movable unit can be simply corrected.

SUMMARY OF THE INVENTION

In order to achieve the object, an imaging apparatus as an aspect of the present invention includes the following:
an imaging unit configured to acquire an image;
a movable unit configured to change a direction of the imaging unit through rotation thereof around a predetermined axis;
at least one processor or circuit configured to function as a correction processing unit configured to perform correction processing of correcting rotation of the image caused by rotation of the movable unit on the basis on the information on a relationship between a rotation angle around the axis and a rotation angle of an image acquired by the imaging unit.

Further features of the present invention will become apparent from the following description of embodiments with reference to the attached drawings.

DESCRIPTION OF THE EMBODIMENTS

Figure 1:
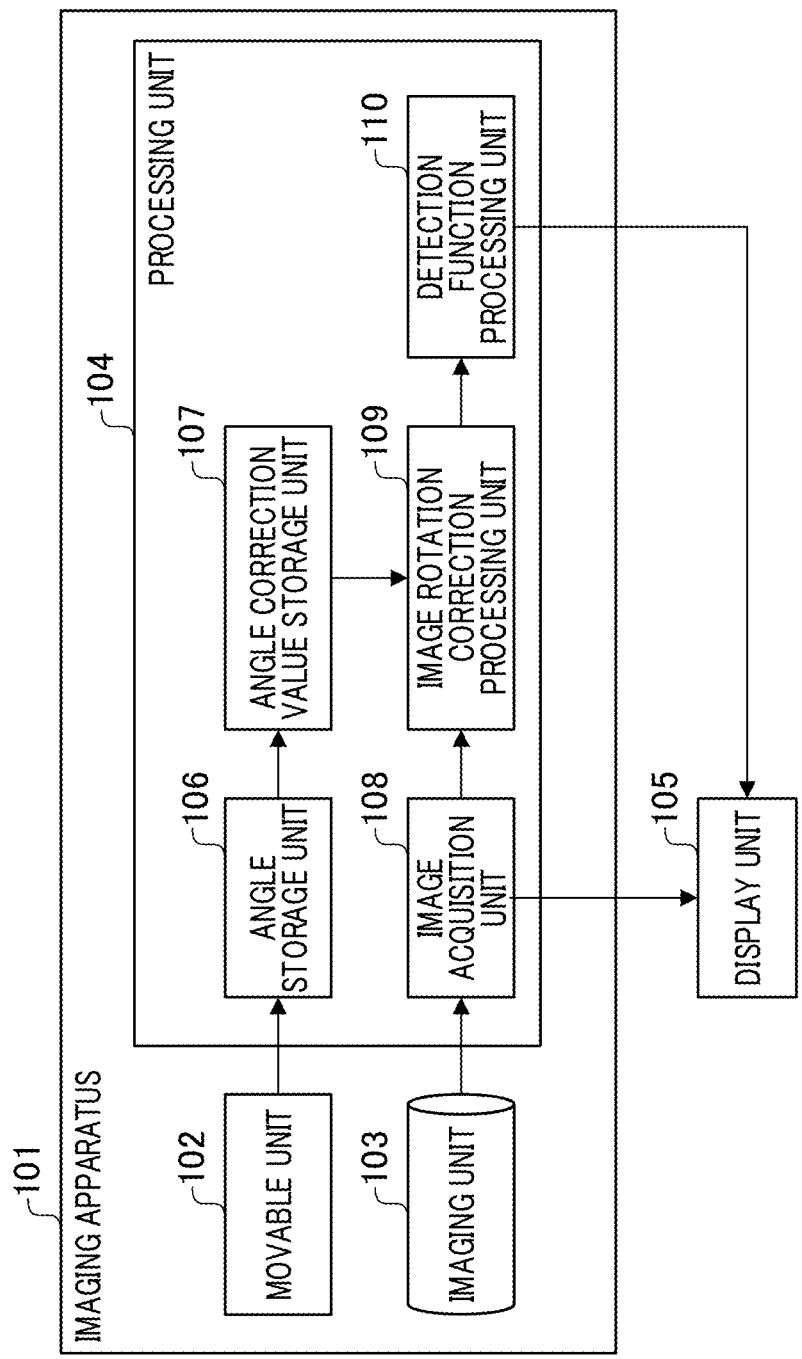
FIG. 1 is a diagram illustrating a configuration of an imaging apparatus of Embodiment 1.

Preferred modes of the present invention will be described below with reference to the accompanying drawings using an Embodiments. In each diagram, the same members or constituent elements are denoted by the same reference numerals and a duplicate description will be omitted or simplified.

Also, in examples, an example in which a network camera is applied as an imaging apparatus will be described. Here, the imaging apparatus includes digital still cameras, digital movie cameras, smartphones with a camera, tablet computers with a camera, electronic equipment having an imaging function such as in-vehicle cameras, and the like.

Embodiment 1

Embodiment 1 of the present invention will be described below with reference FIG. 1. FIG. 1 is a diagram illustrating a configuration of an imaging apparatus in Embodiment 1.

An imaging apparatus 101 includes a movable unit 102, an imaging unit 103, a processing unit 104, and the like. A display unit 105 functions as a display means for displaying an image. Here, the display unit 105 may be an external monitor or the like or may be a display unit of a terminal of a PC and is connected to the imaging apparatus over a network.

The processing unit 104 may also be included in a terminal such as an external PC connected to the imaging apparatus over a network. That is to say, the imaging apparatus in this example is not limited to an integrated system and includes a system configured as a separate body. The display unit 105 may be integrally formed with the imaging apparatus.

Figure 2A:
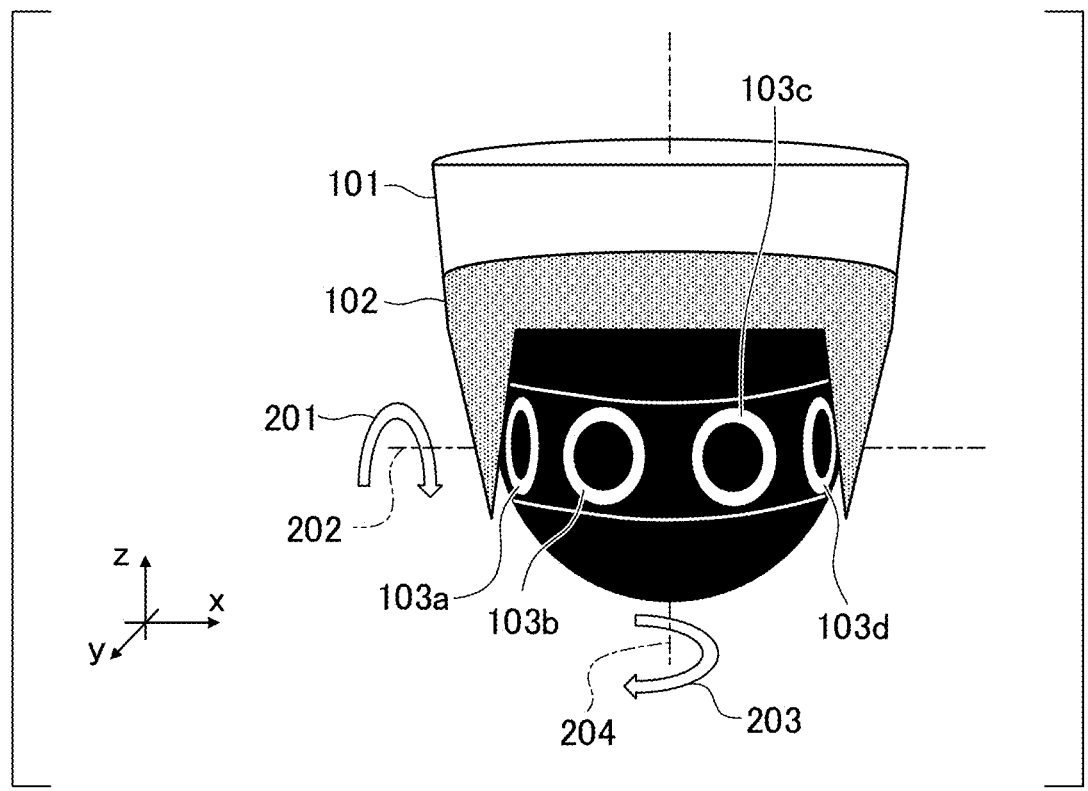
FIG. 2A is a front view of an example of the imaging apparatus in the present invention and FIG. 2B is a diagram illustrating an example in which the imaging apparatus in the present invention is rotated downward by 90 degrees.

When the display unit 105 is connected to a terminal such as a PC, it is possible to remotely control photographing control, pan/tilt control, and the like of the imaging apparatus on the basis of a control signal from the PC. The movable unit 102 is configured to rotatably hold the imaging unit 103 in a tilt direction around a predetermined axis 202 as illustrated in FIG. 2A. The movable unit 102 can be rotated, for example, manually in a pan direction around an axis 204 as illustrated in FIG. 2A, when the imaging apparatus 101 is installed.

The imaging unit 103 includes a lens barrel including a lens and an image sensor for acquiring a video signal (an image). The imaging unit 103 is supported by a housing having a spherical shape.

The processing unit 104 has a built-in CPU as a computer and functions as a control means for executing various operations of the entire imaging apparatus on the basis of a computer program stored in a program memory (not shown).

The processing unit 104 includes an angle storage unit 106, angle correction value storage unit 107, an image acquisition unit 108, an image rotation correction processing unit 109, and detection function processing unit 110.

The angle storage unit 106 stores a value of an angle (a pan angle) at the time of initial setting of the movable unit 102. Here, the angle storage unit 106 is composed of an SRAM, DRAM, PROM, EEPROM, or the like, but is not limited thereto. Angle information stored in the angle storage unit 106 is sent to an angle correction value storage unit 107. On the other hand, an image acquired in the imaging unit 103 is transmitted to the image acquisition unit 108.

The image acquired in the image acquisition unit 108 is output to the display unit 105. An interface to the display unit 105 may be wired or wireless and is used for transmitting an image using distribution using an IP via a communication unit (not shown), an HDMI (registered trademark), an SDI, or the like. The image sent to the display unit is also sent to the image rotation correction processing unit 109.

Also, in the image rotation correction processing unit 109, the image is subjected to rotation correction using angle correction information transmitted using the angle correction value storage unit 107. The image which has been subjected to the rotation correction is subjected to various detection processes using a detection function processing unit 110.

The detection processes have a plurality of types of detection functions such as processes performed on the basis of images and sounds such as person recognition, person counting, intrusion detection, carrying-away detection, and scream detection. Moreover, the detected result is superimposed and displayed on the display unit 105.

Figure 2B:
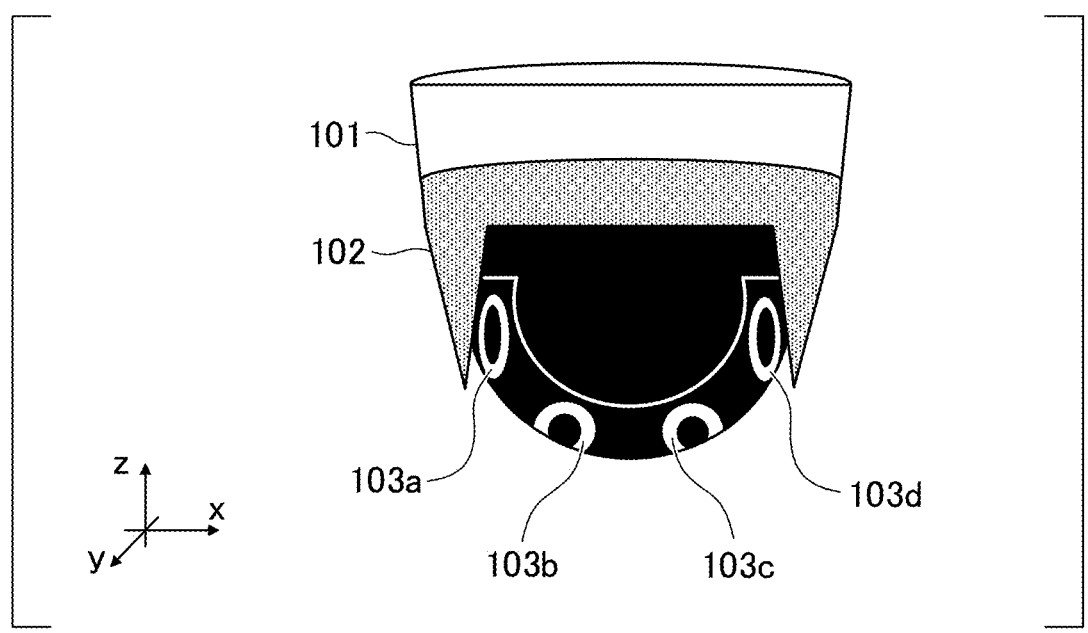

A structure of the imaging apparatus 101 will be described below with reference to FIGS. 2A and 2B. FIGS. 2A and 2B are diagrams illustrating an example of the imaging apparatus in the present invention. Furthermore, FIG. 2A is a front view of the example of the imaging apparatus of the present invention and FIG. 2B is a diagram illustrating an example in which the imaging apparatus of the present invention is rotated downward by 90 degrees.

Although FIGS. 2A and 2B illustrate an example in which an upper portion of the imaging apparatus 101 is fixedly installed on an XY plane of a ceiling, the upper portion of the imaging apparatus 101 may be installed facing downward or may be installed on an XZ plane or a YZ plane.

Also, the imaging unit 103 can rotate in a tilt direction with a movable axis 202 as an axis of tilt rotation and can rotate in a pan direction as shown with an arrow 203 with a movable axis 204 as an axis of pan rotation.

The imaging units 103a to 103d are housed in a spherical housing and the movable unit 102 rotatably pivotally supports the spherical housing at both ends of the spherical housing in a radial direction, rotation in the tilt direction with the movable axis 202 as the axis of rotation is possible. Furthermore, by rotating the movable unit 102 about the movable axis 204, the imaging units 103a to 103d can be rotated in a pan direction.

An example in which these rotations are performed manually will be described first, but as will be described later, these rotations may be rotated in an electrically-powered manner by using a motor and so on. The movable axes 202 and 204 themselves may not rotate. That is to say, any imaging units may be used as long as the imaging units rotate around the axes of the movable axes 202 and 204 and the movable axis also includes such an axis.

In this example, optical axes of the imaging units 103a to 103d are arranged in a twisted direction (a tilted direction) which is not parallel to a perpendicular line drawn from a center point (not shown) on an axis of the movable unit 102. An optical axis of each imaging unit is directed outward from a center of the spherical housing.

Although four imaging units which are the imaging unit 103a to the imaging unit 103d are illustrated in the drawings, the number of imaging units is not limited thereto, and the effects of this example can be obtained using one or more thereof as long as a twisted positional relationship with respect to the movable axis is provided.

Here, if the optical axis of the imaging unit 103 is directed in a direction parallel to a direction perpendicular to the axis of rotation of the movable unit 102, it is defined as not twisted. On the other hand, it is defined as having an increasing twist as the optical axis of the imaging unit 103 becomes closer to being parallel to the axis of rotation of the movable unit 102. That is to say, in a case in which a twist is larger, when the movable unit 102 is rotated, an image acquired by the imaging unit 103 is rotated more.

FIG. 2B illustrates a state in which the spherical housing is rotated about the movable axis 202 by about 90 degrees in an arrow 201 direction from the state of FIG. 2A using the movable unit 102 of the imaging apparatus 101. Here, if attention is paid to the imaging unit 103a, a Z-axis positive direction (an upward direction of the image acquired by the imaging unit 103a) in the state of FIG. 2A is rotated by a predetermined angle due to the rotation of a center of the movable axis 202 and is tilted in a positive direction in a Y-axis direction in FIG. 2B.

In this way, the rotation of the imaging unit 103a around the optical axis thereof occurs along with the motion in the arrow 201 direction of the movable unit 102. This is because the optical axis of the imaging unit 103a is not parallel to a line perpendicular to the movable axis 202 and they have a twisted positional relationship. As a result, if an image acquired by the imaging unit 103a is displayed on the display unit, in the case of FIG. 2B, the screen which stands upright in FIG. 2A includes an image in which it is rotated to the right by, for example, about 45 degrees to 90 degrees.

Figure 3:
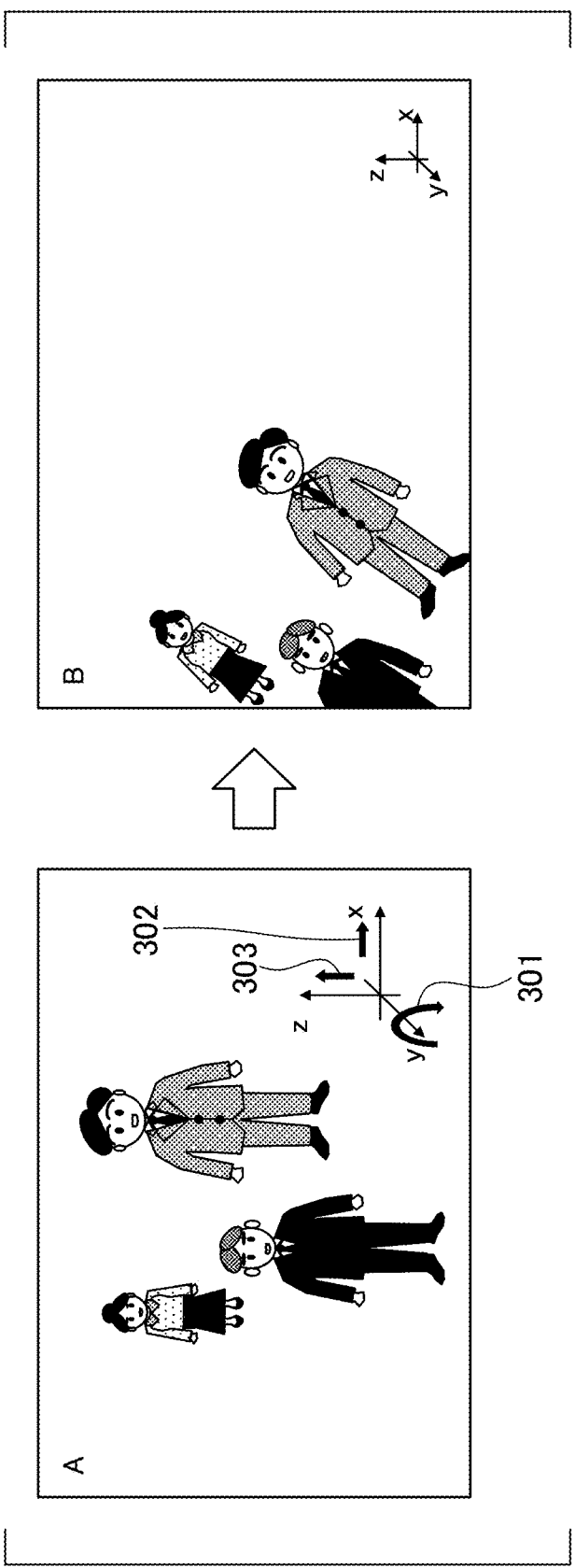
FIG. 3 is an image diagram illustrating a photographed image.

FIG. 3 illustrates an example of a display image of the imaging unit 103a before and after the movable unit 102 is rotated. FIG. 3 is an image diagram of a photographed image.

A of FIG. 3 illustrates a photographed image of the imaging unit 103a before the movable unit 102 is rotated about the movable axis 202 by a predetermined angle in the arrow 201 direction (a state of FIG. 2A). Furthermore, B of FIG. 3 illustrates a photographed image of the imaging unit 103a after the movable unit 102 is rotated about the movable axis 202 by a predetermined angle in the arrow 201 direction (a state of FIG. 2B). An angle of view of a person image displayed standing upright with respect to the XY plane before the rotation changes (rotates) as the movable axis 202 rotates.

That is to say, an angle of view in which rotation around the optical axis centering on a Y axis (an arrow 301 direction) and shifting in an X direction (an arrow 302 direction) and a Z direction (an arrow 303 direction) are mixed changes.

As a result of the rotation about the Y axis, a display image in which a person is tilted such as the screen in A of FIG. 3 to the screen in B of FIG. 3 is obtained.

On the other hand, when a detection function such as person detection using image recognition and the like is utilized, a method for identifying a human body by detecting the shape of the silhouette of a person may be used. In such a case, a person photographed at an angle may not be identified as a person and is likely to lead to false detection. In this example, when unnecessary rotation occurs in the image of the imaging unit due to, for example, a tilt operation of the movable unit 102 in this way, before detection processing using image recognition and the like is performed, correction processing for correcting a rotation component through internal processing is performed. Thus, a false detection rate is reduced.

Figure 4A:
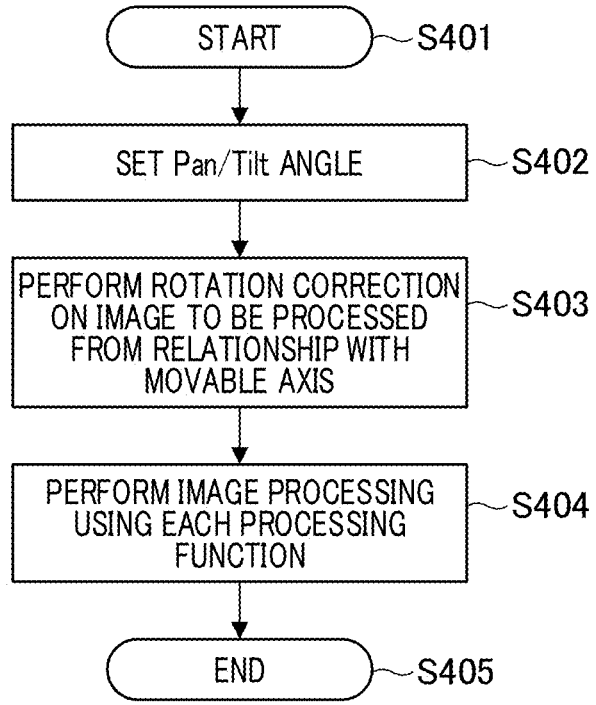
FIG. 4A is a flowchart for describing an operation flow in Embodiment 1 and FIG. 4B is a diagram for explaining the result of the flow.
Figure 4B:
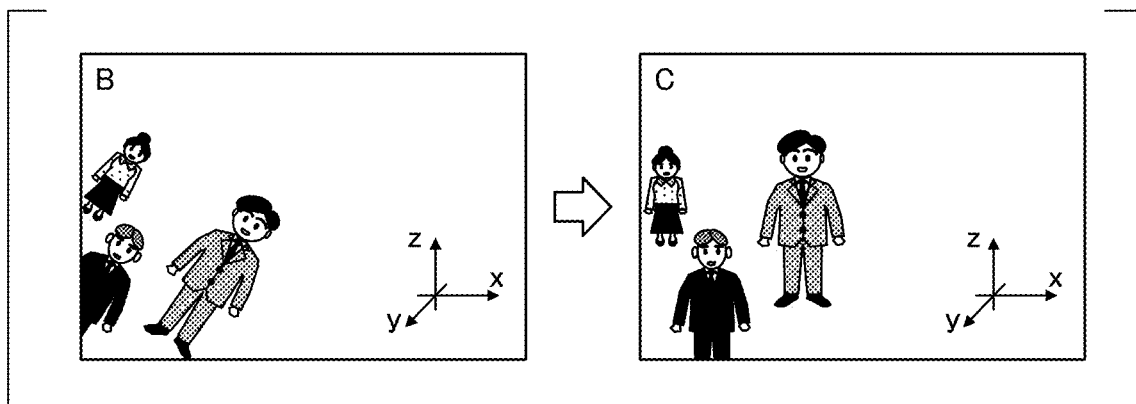

FIGS. 4A and 4B are diagrams for explaining control in this example and a control flow in this example will be described with reference to the flowchart of FIG. 4A.

In Step S401, a flow starts. In addition, in Step S402, a user initially sets pan/tilt angles of the lens barrel provided in the imaging unit when the imaging apparatus is installed. The angle at the time of initial setting is detected at the time of starting-up the imaging apparatus.

In addition, in Step S403, an image captured by each imaging unit is rotated and corrected through internal processing with reference to a rotation correction table (rotation correction information) according to the set angles and a distance from the axis of rotation. In this connection, instead of using the table, the rotation correction information may be obtained by a mathematical calculation and so on.

The rotation correction table is stored in the angle correction value storage unit 107 and is a table in which a relationship between a rotation angle around an axis of driving and a rotation angle of the image of the imaging unit based on an arrangement relationship between the imaging unit and an axis of driving is shown.

Here, Step S403 functions as a correction processing unit configured to perform correction processing for correcting the rotation of the image caused by the movable unit on the basis of the table, together with the image rotation correction processing unit 109.

FIG. 4B illustrates an example of the result of the correction processing in Step S403.

The image illustrated in B of FIG. 4B (corresponding to the image of B in FIG. 3) has unnecessary rotation caused by a tilt operation and has a person outside of an upright position. The correction processing in Step S403 is to subject such an image to rotation correction to perform correction such that the person in the image has a direction in which the person is standing upright.

In Step S403, the rotated image as illustrated in B of FIG. 4B is corrected to an upright image as illustrated in C. After that, in Step S404, the detection function processing unit 110 performs image recognition processing such as face recognition, person detection, and the like using the image which has been subjected to the rotation correction. Here, Step S404 functions as a detection means for performing a predetermined detection operation on the basis of the image.

A method for calculating a rotation correction angle will be described below with reference to FIGS. 5A and 5B.

Figures 5A, 5B:
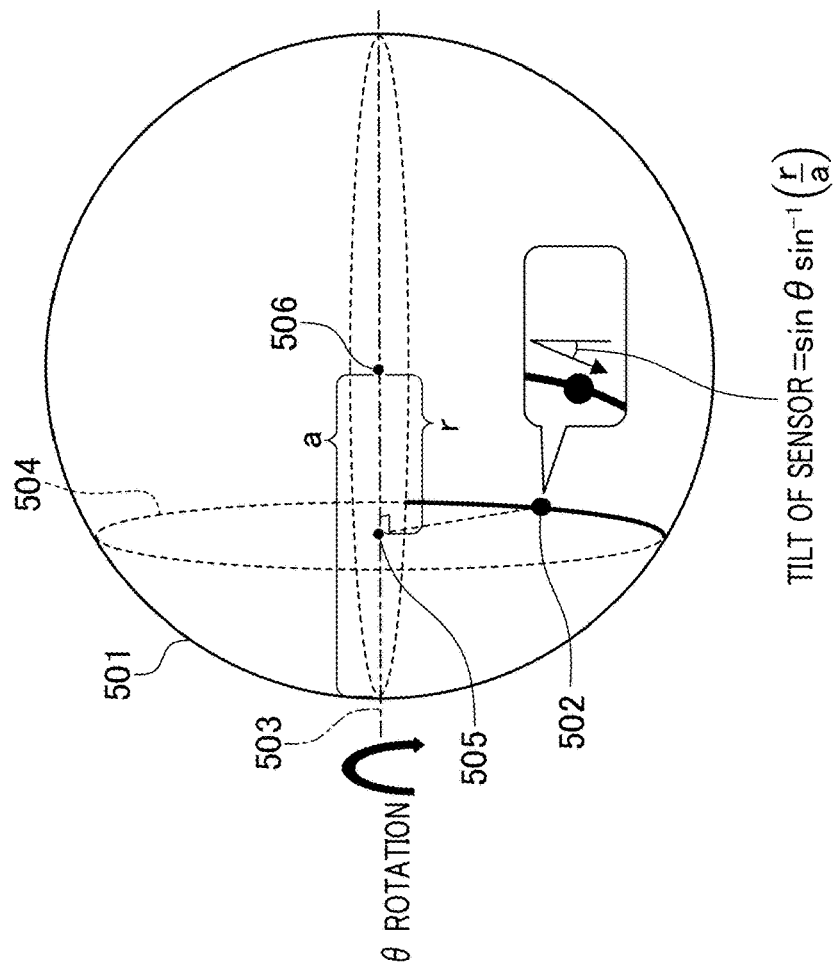
FIG. 5A is an explanatory view of a rotation correction angle and FIG. 5B is a diagram illustrating an example of a correction angle table.

FIG. 5A is an explanatory view of a rotation correction angle and FIG. 5B is a diagram illustrating an example of a correction angle table.

Here, for the sake of simplification, it is assumed that the lens barrel of the imaging apparatus 101 is regarded as a sphere 501, a position in which the imaging unit is attached is a point 502, and an axis of rotation for performing tilt rotation is an axis 503.

Also, a in the drawings is a radius of the sphere and r is a distance from an intersection 505 with a perpendicular line drawn from the point 502 to the axis 503 to a center 506 of the sphere.

Furthermore, the point 502 represents a position of the imaging unit in which the imaging unit faces in a direction parallel to the XY plane in FIG. 2, the axis 503 from a tilt horizontal position (the state in FIG. 2A) is used as an axis of rotation, and rotation is performed over an angle θ. In addition, it is assumed that the optical axis of the imaging unit is directed, for example, in a direction outward from the center 506 to pass through the point 502.

At this time, a trajectory along which the imaging unit can move corresponds to a solid line portion of a circle 504 and the circle 504 corresponds to an intersection between a plane which passes through a point 505 and is perpendicular to the axis 503 and the sphere 501. A component in a rotation direction around the optical axis of the imaging unit when tilt rotation is performed by the angle θ from the tilt horizontal position (the state of FIG. 2A) can be represented by the following Expression 1:

$$\sin\theta \sin^{-1}\frac{r}{a} \qquad \text{[Expression 1]}$$

Based on this, it can be seen that, w % ben the tilt axis rotation angle θ increases and when the position to which the imaging unit is attached becomes closer to the axis 503 of the tilt rotation (when r increases), the rotation component becomes increasingly dominant.

FIG. 5B illustrates an example of an angle correction table 504 included in the angle correction value storage unit 107. Here, the angle correction table 504 is a table showing the relationship between the rotation angle around the movable axis and the rotation angle of the image of the imaging unit based on the arrangement relationship between the imaging unit and the movable axis.

In this example, the imaging apparatus has four imaging units, but the number of imaging units is not limited thereto. Furthermore, it is assumed that the angle correction table includes a correction table having the details corresponding to the plurality of imaging units. Here, a table is shown when the imaging units are disposed in a left-right symmetrical manner as illustrated in FIG. 2.

That is to say, imaging units A to D are disposed on the intersection between a predetermined plane including the axis 503 and the sphere 501 and the imaging units A and B have a line-symmetrical positional relationship with the imaging units D and C with respect to the line perpendicular to the axis 503 passing through the center 506 in the predetermined plane. However, the arrangement of the imaging units is not limited thereto and may be an asymmetrical case.

In the table, the position of each imaging unit disposed above the imaging apparatus and a correction angle according to, for example, a tilt angle θ initially set manually by an installer are uniquely determined. The positions of the imaging units mentioned herein are the position to which the imaging units 103a to 103d illustrated in FIGS. 2A and 2B are attached and differ in accordance with the imaging apparatus. Here, for the sake of simplification, although a tilt angle setting value is illustrated for one degree, it is assumed that a finer solution can also be set.

Alternatively, if a high image recognition ability (detection ability) is provided, the tilt angle setting value may be set for a coarser angle. Furthermore, when the characteristics of the image recognition ability (detection ability) change non-linearly with respect to the rotation angle of the image, a pitch of the tilt angle may be set non-uniformly in accordance with non-linear characteristics curve. That is to say, setting values in this table are set in accordance with the characteristics of the image recognition ability (detection ability).

Each acquired image is subjected to rotation correction using the angle of the correction angle shown in this table, is subjected to detection function processing using image recognition and the like, and then is displayed on the display unit 105.

In the imaging apparatus as illustrated in FIGS. 2A and 2B, as described above, the imaging units are disposed in a left-right symmetrical manner. In such a case of left-right symmetry, rotation correction may be performed by providing only the correction table of the imaging unit on one side with respect to an axis of symmetry.

That is to say, in FIGS. 2A and 2B, a pair of the imaging unit 103a and the imaging unit 103d have a symmetrical positional relationship and a pair of the imaging unit 103b and the imaging unit 103c have a symmetrical positional relationship. Therefore, the angle correction table included in the angle correction value storage unit 107 may be only a table for the imaging unit on one side with respect to the axis of symmetry. That is to say, a table for one of the pair of imaging units may be provided and a table for the other of the pair of imaging units may be omitted.

In the image acquired by the imaging unit on the opposite side of the axis of symmetry, if the reverse rotation by the angles of rotation correction values of the imaging units at the symmetrical positions is corrected, correction can be performed. When the imaging units are disposed in a left-right symmetrical manner in this way, it is possible to perform rotation correction efficiently using the capacity of the angle correction value storage unit 107.

Embodiment 2

Embodiment 2 in the present invention will be described below.

Figure 6:
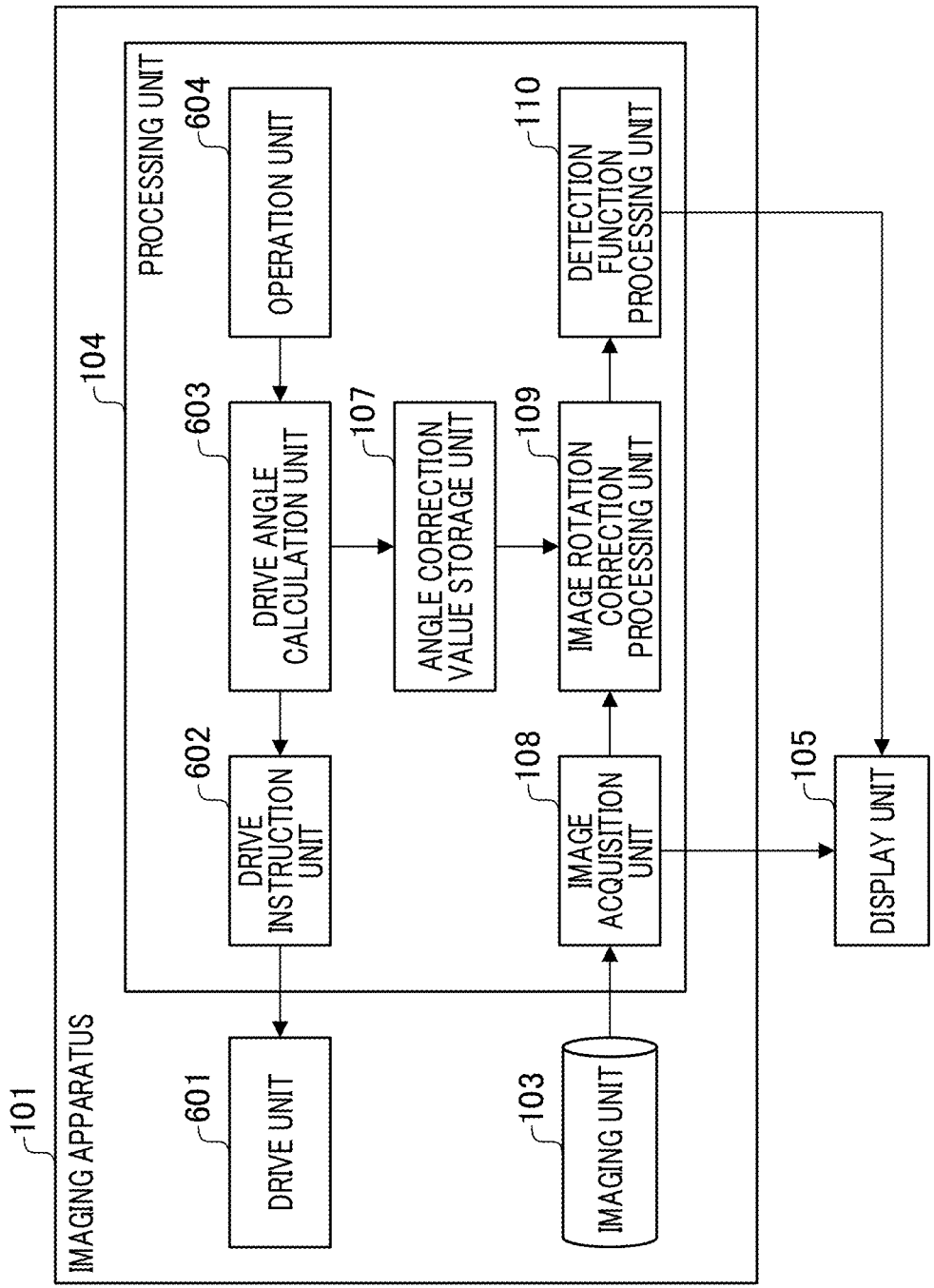
FIG. 6 is a diagram illustrating a configuration of an imaging apparatus in Embodiment 2.

Embodiment 2 will be described below with reference to FIG. 6. FIG. 6 is a diagram illustrating a configuration of an imaging apparatus in Embodiment 2. Although a correction angle is determined using an angle storage unit 106 and an angle correction value storage unit 107 in the imaging apparatus illustrated in FIG. 1, the movement is performed in an electrically-powered manner in this example. Thus, a method for determining a correction angle is different from that of Embodiment 1.

In FIG. 6, an imaging unit 103 performs the drive of pan/tilt and the like through the driving of a drive unit 601. Here, the drive unit 601 functions as a drive means for rotating a movable unit around a movable axis. Although the drive unit includes a motor such as a DC motor, a stepping motor, and an ultrasonic motor and rotates an axis of driving using a gear mechanism with gears, a belt, or the like, the driving method is not limited thereto. The drive unit 601 performs driving in accordance with a drive instruction sent from a drive angle calculation unit 603 via a drive instruction unit 602.

The drive instruction unit 602 includes a device such as a motor driver and the drive angle calculation unit 603 calculates a drive angle using a microcomputer, an IC such as an FPGA and an ASIC in which calculation processing can be performed, and the like. Furthermore, the drive angle calculation unit 603 calculates the drive angle in accordance with an amount of operation using an operation unit 604 of the imaging apparatus 101.

The drive angle calculated in the drive angle calculation unit 603 is transmitted to the angle correction value storage unit 107, a rotation correction angle according to the drive angle is extracted from a table, and correction is performed using an image rotation correction processing unit 109.

In FIG. 6, the drive angle is directly output from the drive angle calculation unit 603 to the angle correction value storage unit 107. However, when it is difficult to control the drive angle such as when driving is performed using the DC motor, it is desirable to separately utilize a sensing sensor or an encoder such as an acceleration sensor or a gyro sensor to acquire the rotation angle.

This example also includes control when a sensor for such angle sensing is used. In this case, an angle value sensed by a sensor for angle sensing installed in the drive unit 601 is transmitted to the angle correction value storage unit 107. In FIG. 6, the other constituent elements illustrated are the same as those described in Embodiment 1 and a description thereof will be omitted.

Figure 7:
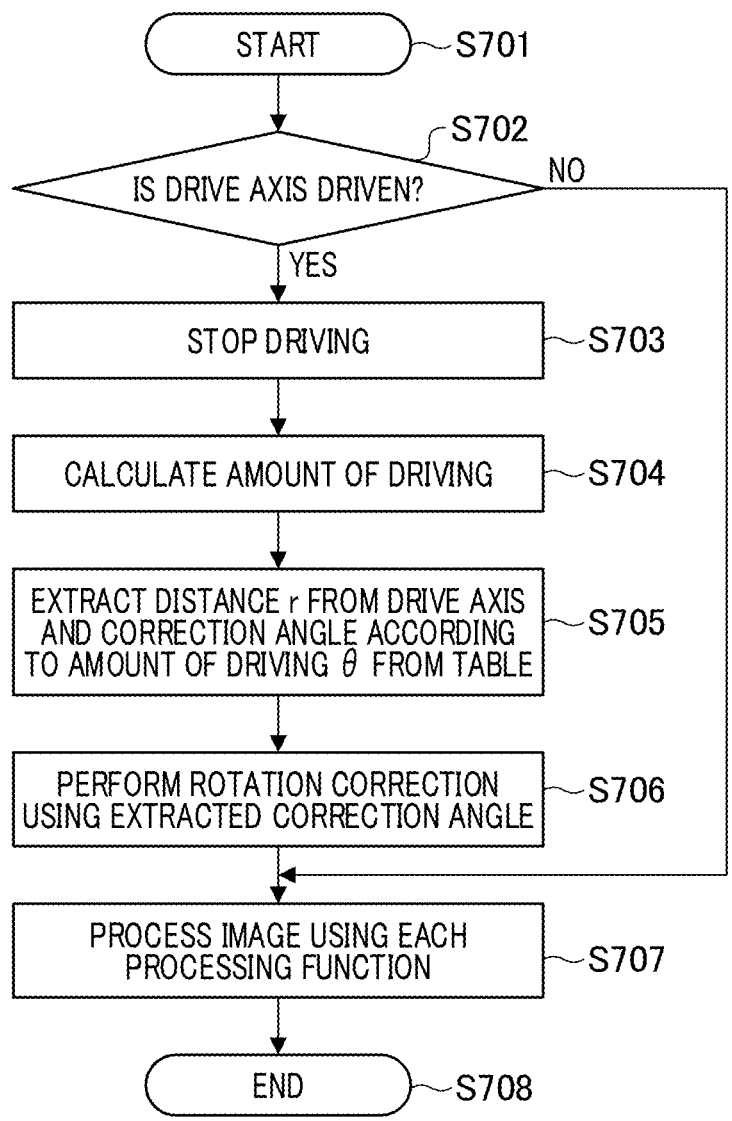
FIG. 7 is a flowchart for describing an operation flow in Embodiment 2.

A control sequence of this example will be described below with reference to FIG. 7. FIG. 7 is a flowchart for describing an operation flow in Embodiment 2.

In Step S702, if an instruction used for rotating an axis of rotation is sent from the drive instruction unit 602 to the drive unit 601 during photographing, the axis of driving rotates.

Moreover, after the movement is performed to a predetermined position, if the rotation stops in Step S703, an amount of movement (a rotation angle) from before driving is calculated in Step S704. The process of Step S704 is an example of open control and when control is performed using a separate sensor and when feedback control is performed have different control sequences.

In Step S705, a distance r from the axis of driving at a position to which the imaging unit is attached and a correction angle corresponding to an angle θ of the axis of driving which has rotated through the driving are extracted from the table. In Step S706, rotation correction is performed through internal processing using the extracted correction angle. That is to say, the correction processing is performed by acquiring the rotation angle of the image from a storage means in accordance with the rotation angle using the drive means. Moreover, in Step S707, image processing such as image recognition using each processing function is performed using the image which has been subjected to the rotation correction.

When a drive instruction is not provided, the process proceeds from Step S702 to Step S707 and image processing such as detection processing is performed at any time.

Although a sequence in which rotation correction is not performed while the rotation is being performed is provided in Embodiment 2, when it is also necessary to sense the image being driven such as when driving is performed at a low speed, calculation for rotation correction may be performed during driving as well.

In this example, it is necessary to take into consideration that the image may rotate not only due to a tilt angle but also due to a change of the pan angle. When a tilt is directed in a horizontal direction, the image shifts laterally along with the rotation of the pan. However, when a tilt angle from a horizontal axis increases, the image includes motion including a rotation component due to the pan rotation performed. For this reason, when the axis of driving is moved in an electrically-powered manner, a table in which an arrangement pattern of the axes of driving (a combination of two angles which are a pan angle and a tilt angle) is taken into consideration is held in the angle correction value storage unit.

Embodiment 3

Figure 8:
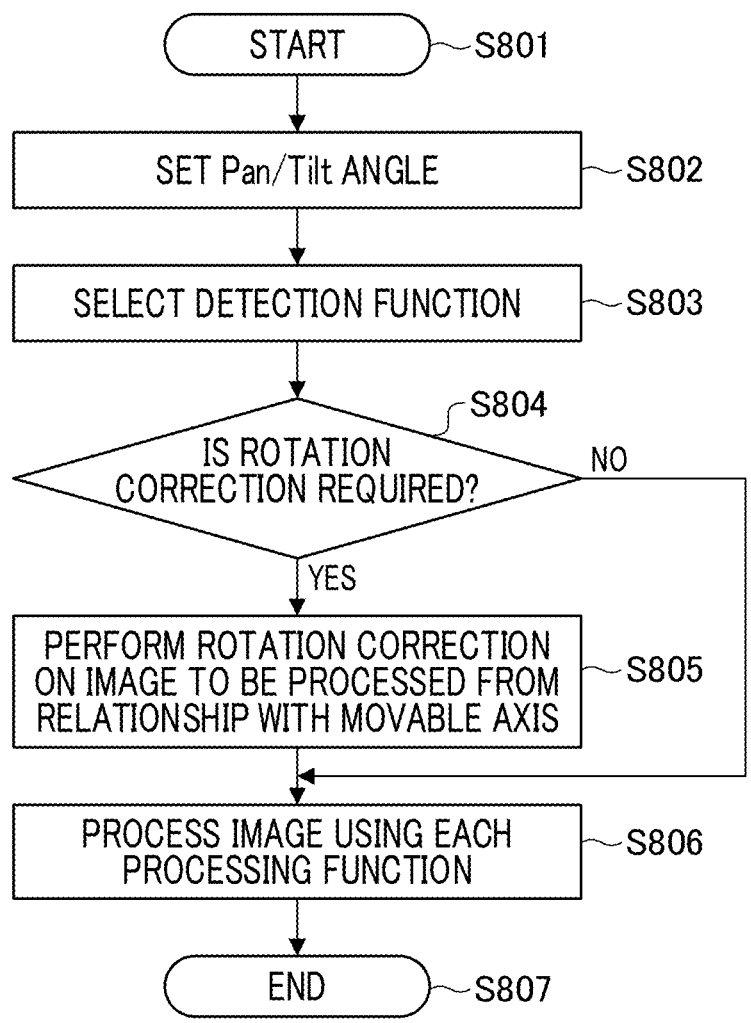
FIG. 8 is a flowchart for describing an operation flow in Embodiment 3.

Embodiment 3 in the present invention will be described below. FIG. 8 is a flowchart for describing an operation flow of Embodiment 3.

Embodiment 3 illustrates control in an imaging apparatus having a plurality of types of detection/sensing functions. Examples of the sensing functions include various functions such as a function for detecting a human body, a function for detecting an intruder, and a function for detecting the removal of an object.

Although various detection methods for the functions are present, when a target image includes the movement in a rotation direction, it may lead to false detection or may not lead to false detection in some cases. For example, in intrusion detection and the like in which an alert is issued in accordance with a determination concerning whether intrusion into a certain region has been performed, when the entering into the region is performed and when the exiting from the region is performed may be identified oppositely due to the rotation of the image in some cases and the intrusion detection and the like is likely to lead to false detection.

On the other hand, for carrying-away detection or the like in which an alert is issued when a placed item is carried away, a method or the like for performing detection using a temporal difference of the image may be utilized. In such a type of detection in which the direction of the image does not affect the identification, the small effect of rotation is provided. When rotation correction is required and when rotation correction is not required are present in accordance with the type of detection function used in this way. Based on this, the control sequence will be described.

In Step S801, an operation flow starts, and in Step S802, a pan/tilt angle is set by default at the time of installation. Moreover, In Step S803, a detection function to be used is selected. In Step S804, a determination concerning whether the selected detection function is of a type in which rotation correction is required is performed. If the determination result is Yes (correction is determined to be required), control is performed in the order of Step S805 and Step S806 as in Embodiment 1. The rotation correction is performed.

In Step S804, when it is determined that rotation correction is not required in the selected detection function, the process proceeds to the process of Step S806 without performing the correction and the process of the detection function is performed. That is to say, Step S804 and Step S805 function as a correction processing unit configured to perform a switching concerning whether to perform correction in the correction processing unit in accordance with the type of detection function in the detection means.

Embodiment 4

Figure 9:
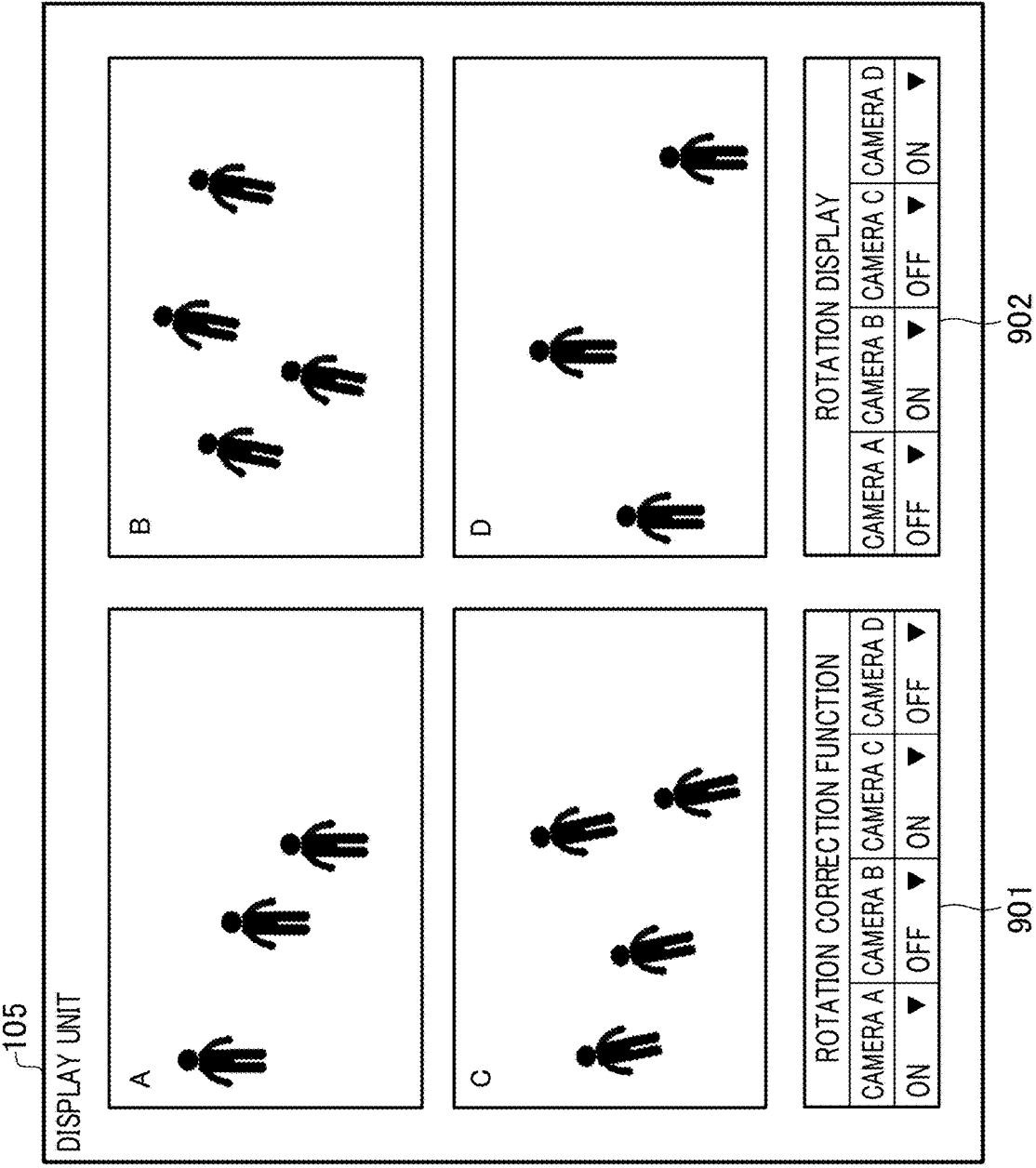
FIG. 9 is a diagram for explaining an example of display in Embodiment 4.

Embodiment 4 in the present invention will be described below. FIG. 9 is a diagram for explaining an example of display on a display unit 105 in Embodiment 4.

Displayed images A to D are images captured by an imaging unit 103a to an imaging unit 103d. Although a case in which images of the four imaging units are displayed as an example is illustrated, the number of images on the displayed video is not limited thereto.

Images acquired from the imaging units 103a to 103d, a rotation correction function operation window 901, and a rotation display function operation window 902 are provided on the display unit 105.

The rotation correction function operation window 901 is an operation window in which a switching concerning whether a rotation correction function in each of the imaging units is independently used is performed. When the switching of this operation window is performed, a switching concerning whether the image acquired by each of the imaging units is subjected to image rotation correction using internal processing before the detection function is processed is performed.

This makes it possible to perform display concerning whether the correction processing is performed on a display screen of the display means.

Also, the rotation display function operation window 902 is an operation window in which a switching concerning whether the image displayed on the display unit 105 is subjected to the rotation correction is performed. This operation window can also be set and operated independently for each image from the imaging unit, as in the rotation correction function operation window 901.

Thus, the image rotation correction processing unit 109 can perform a switching concerning whether each image acquired from each of the imaging units is subjected to correction.

When ON/OFF of the rotation correction is switched using this rotation display function operation window 902, it is possible to perform a switching concerning whether the image displayed on the display unit 105 is an image before the rotation correction or an image after the rotation correction.

Furthermore, although the rotation correction function operation window 901 and the rotation display function operation window 902 show a method for switching between ON and OFF in a pull down manner in the drawings, the operation method is not limited thereto. In addition, the rotation correction function operation window 901 and the rotation display function operation window 902 function independently and need not necessarily to be displayed as a set.

Embodiment 5

Embodiment 5 in the present invention will be described below. Examples 1 to 4 include the photographed images subjected to rotation in the processing unit 104 of the imaging apparatus 101 which have been described as a rotation correction function. Examples 1 to 4 are different from Embodiment 5 in that, in Embodiment 5, a detection direction is adjusted to match a rotation angle of an imaging unit in the detection function processing, instead of the rotation of the image.

Figure 10:
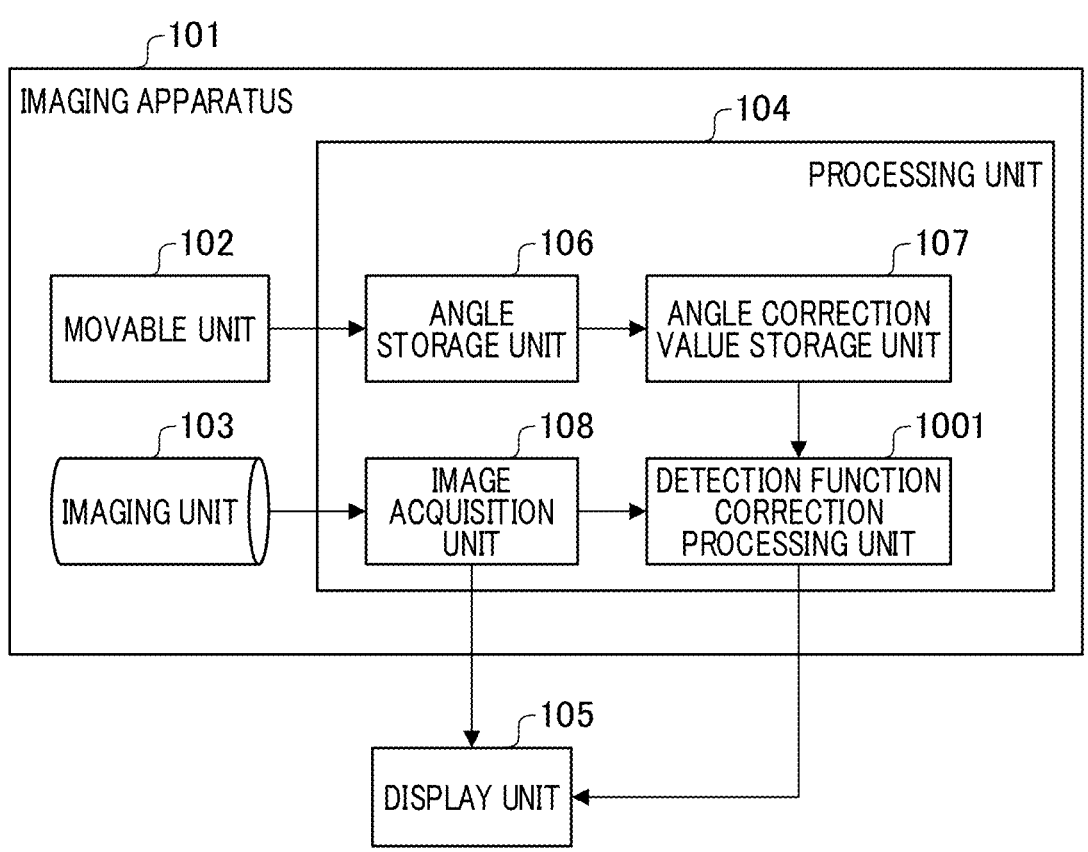
FIG. 10 is a diagram illustrating a configuration of an imaging apparatus in Embodiment 5.

A description will be provided below with reference to FIG. 10. FIG. 10 is a diagram illustrating a configuration of an imaging apparatus in Embodiment 5. Here, a description of constituent elements of Embodiment 5 which are different from those of Embodiment 1 will be provided. A rotation correction angle extracted in an angle correction value storage unit 107 is transmitted to a detection function correction processing unit 1001.

The detection function correction processing unit 1001 performs a detection function in which an image received from an image acquisition unit 108 has angle correction from an angle correction value storage unit 107 taken into consideration. That is to say, the detection function correction processing unit 1001 functions as a correction processing unit configured to change a detection direction of image recognition in accordance with the angle correction at the time of performing detection processing by performing image recognition or the like.

Although an image rotation correction processing unit 109 is provided in Embodiment 1, Embodiment 5 is characterized in that an image is not subjected to a process of performing rotation of the image and is subjected to a process in which rotation is taken into consideration at a detection function processing stage. In this example, when such a process is performed, it is possible to prevent a peripheral portion of the image from being lost by rotating and processing the image and it is possible to efficiently utilize the captured image.

Therefore, even when a suspicious person appears on a peripheral portion of the image, the effect capable of performing reliable sensing is obtained.

In the above description, each unit may include a discrete electronic circuit or a part or the whole thereof may be configured of an FPGA, a CPU, or the like.

Embodiment 6

In the above Embodiments, images obtained by the imaging units 103a to 103d are separately processed, those images may be synthesized to form, for example, a panoramic image. In Embodiment 6, a process for synthesizing the panoramic image will be described.

Since each image obtained by each of the imaging units 103a to 103d is rotated with respective angle, because of the twist, therefore, if those images are synthesized without correcting each rotation, synthesized image will become distorted.

In Embodiment 6, the rotation of each image obtained by each of the imaging units is corrected by the image rotation correction processing unit 109 and then are synthesized. To be more specific, the image rotation correction processing unit 109 corrects each image obtained by each imaging unit based on the rotation correction table. Since each imaging unit has a different twist amount, the table for each imaging unit is different and correction amount for each image is different.

After correcting each image obtained from the imaging units 103a to 103d, those images are synthesized to generate the panoramic image to be displayed on the display unit 105.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

A computer program configured to realize the functions of the above-described embodiments with a part or all of the control in this example may be supplied to the image processing apparatus over a network or through various storage media. Moreover, a computer (or a CPU, an MPU, or the like) in this image processing apparatus may read and execute a program. In this case, the program and the storage medium configured to store the program constitute the present invention.

This application claims the benefit of Japanese Patent Application No. 2020-023732 filed on Feb. 14, 2020, which is hereby incorporated by reference herein in its entirety.

What is claimed is:

1. An imaging apparatus, comprising:
   an imaging unit including a lens and an image sensor that acquires an image;
   a movable mount having a predetermined axis around which the imaging unit is rotatably mounted, wherein the movable mount can change a direction of the imaging unit through rotation thereof around the predetermined axis, and wherein an optical axis of the imaging unit has a predetermined twisted positional relationship with the predetermined axis; and
   at least one processor or circuit that functions as a correction processing unit configured to perform correction processing of correcting rotation of the image caused by rotation of the movable mount on the basis of information on a relationship relating to a difference between a rotation angle around the predetermined axis and a rotation angle of an image acquired by the imaging unit.

2. The imaging apparatus according to claim 1, further comprising:
   a plurality of imaging units; and
   a storage that stores information corresponding to the plurality of imaging units.

3. The imaging apparatus according to claim 1, further comprising:
   a pair of imaging units which are line-symmetrical with respect to a line perpendicular to the Predetermined axis; and
   a storage that stores information for one imaging unit of the pair of imaging units and does not store information for the other imaging unit.

4. The imaging apparatus according to claim 1, further comprising:
   a storage that stores information on the relationship relating to the difference between the rotation angle around the predetermined axis and the rotation angle of the image acquired by the imaging unit based on an arrangement relationship between the imaging unit and the predetermined axis;
   a drive unit including a motor that causes the movable mount to rotate around the predetermined axis,
   wherein the correction processing unit acquires a rotation angle of the image from the storage in accordance with a rotation angle around the predetermined axis by the drive unit and performs the correction processing.

5. The imaging apparatus according to claim 1,
wherein the at least one processor or circuit further functions as a detection unit configured to perform a predetermined detection operation on the basis of the image.

6. The imaging apparatus according to claim 5, wherein the correction processing unit performs the correction processing on the image supplied to the detection unit.

7. The imaging apparatus according to claim 5, wherein the correction processing unit performs correction processing of correcting a detection direction in the detection unit.

8. The imaging apparatus according to claim 5, wherein the correction processing unit performs switching concerning whether to perform correction in the correction processing unit in accordance with a type of detection function in the detection unit.

9. The imaging apparatus according to claim 1, further comprising:
a plurality of imaging units,
wherein the correction processing unit can perform switching concerning whether to perform correction on each image acquired from each of the plurality of imaging units.

10. A method for controlling an image pickup apparatus having an imaging unit including a lens and an image sensor that acquires an image, and a movable mount having a predetermined axis around which the imaging unit is rotatably mounted, wherein the movable mount can change a direction of the imaging unit through rotation thereof around the predetermined axis, and wherein an optical axis of the imaging unit has a predetermined twisted positional relationship with the predetermined axis, the method comprising:
correcting rotation of the image caused by rotation of the movable mount on the basis of information on a relationship relating to a difference between a rotation angle around the predetermined axis and a rotation angle of an image acquired by the imaging unit.

11. A non-transitory computer-readable storage medium that stores a computer program to control an image pickup apparatus having:
an imaging unit including a lens and an image sensor that acquires an image; and
a movable mount having a predetermined axis around which the imaging unit is rotatably mounted, wherein the imaging unit can change a direction of the imaging unit through rotation thereof around the predetermined axis, and wherein an optical axis of the imaging unit has a predetermined twisted positional relationship with the predetermined axis;
wherein the computer program comprises instructions for executing the following processes:
correcting rotation of the image caused by rotation of the movable mount on the basis of information on a relationship relating to a difference between a rotation angle around the predetermined axis and a rotation angle of an image acquired by the imaging unit.

12. An imaging apparatus, comprising:
a first imaging unit acquiring a first image;
a second imaging unit acquiring a second image;
a movable mount rotatably holding the first imaging unit and the second imaging unit around a predetermined axis, wherein optical axes of the first and the second imaging units are not parallel to a perpendicular line perpendicular to the predetermined axis; and
at least one processor or circuit that functions as a correction processing unit configured to perform first correction processing of correcting rotation of the first image caused by rotation of the movable mount on the basis of information on a relationship between a rotation angle of the movable mount around the predetermined axis and a rotation angle of the first image acquired by the first imaging unit, and to perform second correction processing of correcting rotation of the second image caused by rotation of the movable mount on the basis of information on a relationship between a rotation angle of the movable mount around the predetermined axis and a rotation angle of the second image acquired by the second imaging unit.

13. The imaging apparatus according to claim 12,
wherein the first and second imaging units are arranged in a line-symmetrical with respect to the perpendicular line; and
wherein the rotation angle of the first image acquired by the first imaging unit is the same as the rotation angle of the second image acquired by the second imaging unit.

14. The imaging apparatus according to claim 12,
wherein the at least one processor or circuit further functions as a detection unit configured to perform a predetermined detection operation on the image.

15. The imaging apparatus according to claim 14, wherein the correction processing unit performs the correction processing on the image before the detection unit performs the predetermined detection operation on the image.

16. The imaging apparatus according to claim 14, wherein the correction processing unit performs correction processing of correcting a detection direction in the detection unit.

17. The imaging apparatus according to claim 14, wherein the correction processing unit determines whether to perform correction in the correction processing unit in accordance with a type of detection function in the detection unit.

18. The imaging apparatus according to claim 12, further comprising:
a plurality of imaging units,
wherein the correction processing unit can perform switching concerning whether to perform correction on each image acquired from each of the plurality of imaging units.

19. The imaging apparatus according to claim 12,
wherein the correction processing unit synthesizes a plurality of corrected images to generate a synthesized image.

20. The imaging apparatus according to claim 12, further comprising:
a drive unit including a motor that causes the first and second imaging units to rotate around the predetermined axis,
wherein the correction processing unit acquires a rotation angle of the first and the second image on the information in accordance with a rotation angle around the predetermined axis by the drive unit and performs the first and the second correction processing.

21. The imaging apparatus according to claim 12, wherein the relationship between a rotation angle of the movable mount around the predetermined axis and a rotation angle of the first image acquired by the first imaging unit is determined based on a position of the first imaging unit, and the relationship between a rotation angle of the movable mount around the predetermined axis and a rotation angle of the second image acquired by the second imaging unit is determined based on a position of the second imaging unit.

22. A method for controlling an image pickup apparatus having a first imaging unit acquiring a first image, a second imaging unit acquiring a second image, and a movable mount rotatably holding the first imaging unit and the second imaging unit around a predetermined axis, wherein optical axes of the first and the second imaging units are not parallel to a perpendicular line perpendicular to the predetermined axis, the method comprising:

correcting rotation of the first image caused by rotation of the movable mount on the basis of information on a relationship between a rotation angle of the movable mount around the predetermined axis and a rotation angle of the first image acquired by the first imaging unit; and correcting rotation of the second image caused by rotation of the movable mount on the basis of information on a relationship between a rotation angle of the movable mount around the predetermined axis and a rotation angle of the second image acquired by the second imaging unit.

23. A non-transitory computer-readable storage medium that stores a computer program to control an image pickup apparatus having:

a first imaging unit acquiring a first image, a second imaging unit acquiring a second image, and a movable mount rotatably holding the first imaging unit and the second imaging unit around a predetermined axis, wherein optical axes of the first and the second imaging units are not parallel to a perpendicular line perpendicular to the predetermined axis, wherein the computer program comprises instructions for executing the following processes:

correcting rotation of the first image caused by rotation of the movable mount on the basis of information on a relationship between a rotation angle of the movable mount around the predetermined axis and a rotation angle of the first image acquired by the first imaging unit; and correcting rotation of the second image caused by rotation of the movable mount on the basis of information on a relationship between a rotation angle of the movable mount around the predetermined axis and a rotation angle of the second image acquired by the second imaging unit.

\* \* \* \* \*